United States Patent
Qiao

(10) Patent No.: US 12,432,566 B2
(45) Date of Patent: Sep. 30, 2025

(54) RANGING METHOD

(71) Applicant: BEIJING XIAOMI MOBILE SOFTWARE CO., LTD., Beijing (CN)

(72) Inventor: Guangjun Qiao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 416 days.

(21) Appl. No.: 18/088,998

(22) Filed: Dec. 27, 2022

(65) Prior Publication Data
US 2023/0269590 A1 Aug. 24, 2023

(30) Foreign Application Priority Data
Feb. 18, 2022 (CN) .......................... 202210152371.6

(51) Int. Cl.
*H04W 12/63* (2021.01)
*H04W 12/40* (2021.01)
*H04W 64/00* (2009.01)

(52) U.S. Cl.
CPC ........... *H04W 12/63* (2021.01); *H04W 12/40* (2021.01); *H04W 64/00* (2013.01)

(58) Field of Classification Search
CPC . H04W 64/00; H04W 36/0055; H04W 36/08; H04W 36/249; H04W 12/40; H04W 12/086; H04W 12/63
See application file for complete search history.

(56) References Cited

U.S. PATENT DOCUMENTS

| | | | |
|---|---|---|---|
| 11,102,000 B2 * | 8/2021 | de Perthuis | H04L 63/0442 |
| 11,887,416 B2 * | 1/2024 | Hoyer | G07C 9/00563 |
| 11,900,750 B2 * | 2/2024 | Pirch | G07C 9/29 |
| 2016/0294826 A1 * | 10/2016 | Han | H04W 12/086 |
| 2019/0036688 A1 | 1/2019 | Wasily et al. | |

(Continued)

FOREIGN PATENT DOCUMENTS

| | | |
|---|---|---|
| KR | 20160118794 A | 10/2016 |
| KR | 20210071815 A | 6/2021 |
| WO | WO 2020193570 A1 | 10/2020 |

OTHER PUBLICATIONS

Indian Patent Application No. 202344002843, Office Acton dated Feb. 2, 2024, 5 pages.

(Continued)

*Primary Examiner* — Dung Hong
(74) *Attorney, Agent, or Firm* — Cozen O'Connor

(57) ABSTRACT

A ranging method is performed using a terminal device including a processor and a ranging chip. The processor having a security region, and the security region is communicatively connected to the ranging chip. The ranging method includes: acquiring a session parameter generated from an initial communication between the terminal device and a device to be ranged; generating, in the security region, a ranging security parameter according to the session parameter; sending the ranging security parameter to the ranging chip via a communication channel between the security region and the ranging chip; and generating, by the ranging chip, a ranging time parameter according to the ranging security parameter, and performing, by the ranging chip, a ranging communication with the device to be ranged using the ranging time parameter to acquire a ranging result.

14 Claims, 3 Drawing Sheets

(56) References Cited

U.S. PATENT DOCUMENTS

2019/0116619 A1* 4/2019 Hauck .................. H04W 76/10
2020/0062217 A1* 2/2020 Ledvina ................ B60R 25/246
2020/0228943 A1* 7/2020 Martin ............... A63B 24/0062
2021/0176230 A1* 6/2021 Cho ..................... H04L 63/045

OTHER PUBLICATIONS

European Patent Application No. 23152982.7, Search and Opinion dated Jul. 5, 2023, 10 pages.
Car Connectivity Consortium, Digital Key Technical Specification Release 3, Version 1.1.0, 505 pages, Jan. 1, 2022, 505 pages.
Korean Patent Application No. 10-2023-0009953 Office Action dated May 1, 2025, with English translation, 9 pages.
Korean Patent Application No. 10-2023-0009953 Office Action dated Feb. 5, 2025, with English translation, 12 pages.

* cited by examiner

RANGING METHOD

CROSS-REFERENCE TO RELATED APPLICATIONS

The present application claims the benefit of priority to Chinese Application No. 202210152371.6, filed on Feb. 18, 2022, the contents of which are incorporated herein by reference in their entireties for all purposes.

FIELD

The present disclosure generally relates to a terminal device field technology, and more particularly to a ranging method, a ranging apparatus, an electronic device and a storage medium.

BACKGROUND

Wireless carrier communication technology, such as an ultra-wide band (UWB) technology is applied to common terminal devices such as smart phones and wearable devices, and is widely used in ranging and positioning, for example in scenarios such as location sensing, non-inductive (or insensitive) payment, non-inductive entrance for example passing through a subway brake without feeling any trouble, and non-inductive unlock. The above scenarios using ranging and positioning technology have a high requirement for security. However, a security accident such as parameter leakage easily happens during generation of parameters for ranging and positioning for the terminal device, and the security in these scenarios cannot be guaranteed, resulting in threats to user's information and property safeties.

SUMMARY

In a first aspect of embodiments of the present disclosure, a ranging method is provided. The ranging method is performed using a terminal device including a processor and a ranging chip, the processor has a security region, and the security region is communicatively connected to the ranging chip. The ranging method includes: acquiring a session parameter generated from an initial communication between the terminal device and a device to be ranged; generating, in the security region, a ranging security parameter according to the session parameter; sending the ranging security parameter to the ranging chip via a communication channel between the security region and the ranging chip; and generating, by the ranging chip, a ranging time parameter according to the ranging security parameter, and performing, by the ranging chip, a ranging communication with the device to be ranged using the ranging time parameter to acquire a ranging result.

In a second aspect of embodiments of the present disclosure, a ranging method is provided. The ranging method is performed using a device to be ranged, and includes: acquiring a session parameter generated from an initial communication between the device to be ranged and a terminal device; generating a ranging security parameter according to the session parameter; and generating a ranging time parameter according to the ranging security parameter, and performing a ranging communication with the terminal device using the ranging time parameter to acquire a ranging result.

In a third aspect of embodiments of the present disclosure, an electronic device is provided, including: a processor; and a memory having stored therein computer instructions executable by the processor. In case that the computer instructions are executed by the processor, the processor is configured to implement the ranging method as described in the first or second aspect.

In a fourth aspect of embodiments of the present disclosure, a non-transitory computer-readable storage medium is provided. The non-transitory computer-readable storage medium has stored therein a computer program that, when executed by a processor, causes the processor to implement the ranging method as described in the first or second aspect.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of the embodiments do not represent all implementations consistent with the present disclosure. Instead, they are merely examples of apparatuses and methods consistent with aspects related to the present disclosure as recited in the appended claims.

The terms used in the present disclosure are only for the purpose of describing specific embodiments, and are not intended to limit the present disclosure. An item expressed in a singular form such as "a" "an" "the" and "said" in the present disclosure and the appended claims may also refer to the majority forms of the items, unless the context clearly indicates other meanings. It should also be understood that items described with the term "and/or" herein refer to any one of the listed items or all possible combinations of the listed items.

It should be understood that although the terms first, second, third and the like may be used to describe various information in the present disclosure, such information should not be limited to these terms. These terms are only used to distinguish the same type of information from each other. For example, without departing from the scope of the present disclosure, the first information may be called the second information, and similarly, the second information may be called the first information. Depending on the context, the word "if" as used herein can be interpreted as "when" or "in case that" or "in response to determining".

Figure 1:
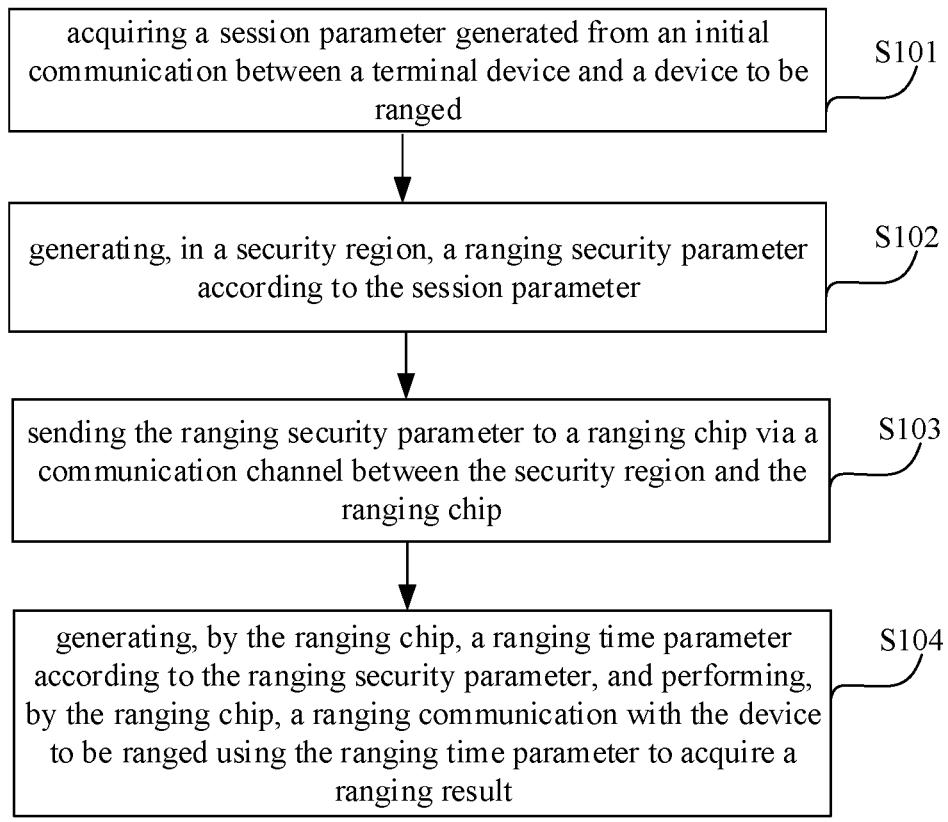
FIG. 1 a flow chart of a ranging method applied in a terminal device according to an embodiment of the present disclosure.

In the first aspect, the present disclosure provides in embodiments a ranging method. As shown in FIG. 1, the method includes operations in blocks S101-S104.

Figure 2:
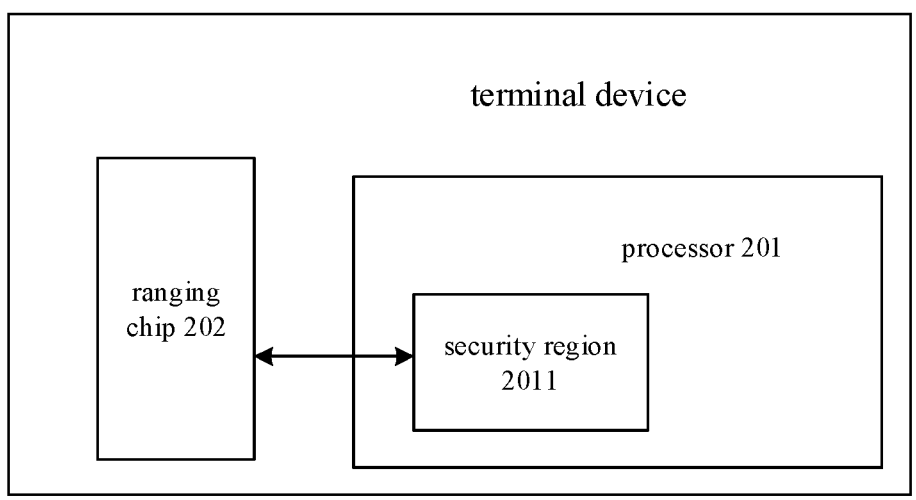
FIG. 2 is a block diagram of a terminal device according to an embodiment of the present disclosure.

The ranging method can be performed using a terminal device as shown in FIG. 2. The terminal device includes a processor 201 and a ranging chip 202, and the processor has a security region 2011, such as a trusted execution environment (TEE). The security region 2011 of the processor 201 can be communicatively connected to the ranging chip 202. That is, they meet communication conditions on the hardware, for example, SPI or I2C bus and other communication buses can be used to realize the communication connection between them. Optionally, the terminal device is installed with a software for ranging, which is used to specifically implement the ranging method. The ranging method can be realized by the UWB technology or other ranging technologies. If the UWB technology is applied, the ranging chip can be a UWB chip. The following operations will give a detailed description of the ranging method by taking the UWB technology as an example.

The ranging method is used to detect a distance between the terminal device executing the ranging method and a device to be ranged. In some embodiments, the terminal device may be a smart phone, a tablet computer, a wearable device, etc., and the device to be ranged may be a vehicle, or a door lock of a house. For example, the terminal device can start the vehicle or unlock the door lock of the house through the ranging method, and thus the terminal device can be used as a digital key.

In block S101, a session parameter generated from an initial communication between the terminal device and a device to be ranged is acquired.

The initial communication between the terminal device and the device to be ranged is an identification process for the two devices before ranging. The terminal device can use the software (e.g., a UWB key service, hereinafter referred to as a ranging software "UKS") that implements the ranging method to perform the initial communication in a region other than the security region of the processor. In an embodiment, the security region of the processor is the TEE, and the region other than the security region of the processor is a rich execution environment (REE). The ranging software UKS has a trusted application (TA) part (hereinafter referred to as UKS TA) running in the security region TEE and a client application (CA) part (hereinafter referred to as UKS CA) set in the other region REE outside the security region. In this embodiment, the initial communication can be performed by the UKS CA. The session parameter can be a session key.

For example, the process of the initial communication between the terminal device and the device to be ranged includes the following operations. First, the terminal device communicates with the device to be ranged, to allow the terminal device and the device to be ranged to verify identities of each other, that is, during the communication process, the terminal device verifies whether the device to be ranged is a pairing device, and the device to be ranged verifies whether the terminal device is a pairing device. When the identities of the terminal device and the device to be ranged are verified by each other (that is, a verification result acquired by the terminal device is that the device to be ranged is the pairing device that can be paired to the terminal device, and a verification result acquired by the device to be ranged is that the terminal device is the pairing device that can be paired to the device to be ranged), the terminal device communicates with the device to be ranged to allow the terminal device and the device to be ranged to generate the same session parameter. It can be understood that the communication between the terminal device and the device to be ranged can be realized by using the ranging software to communicate with the device to be ranged via Bluetooth, near field communication (NFC) and other communication means. The communication between the terminal device and the device to be ranged can be realized by using the ranging software to communicate with the device to be ranged via CCC, FiRa, ICCOA and other protocols.

In block S102, in the security region, a ranging security parameter is generated according to the session parameter.

The ranging software UKS sends the session parameter to the UKS TA in the security region TEE. Condition and manner for generating the ranging security parameter are preset in the UKS TA, and the UKS TA generates the ranging security parameter according to the session parameter in accordance with the condition and manner. For example, the session parameter is a session secret key, and the generated ranging security parameter is a UWB ranging secret key (URSK).

The generation of the ranging security parameter in the security region of the processor can avoid relying on other chips other than the processor, such as an NFC chip, and flexibility of hardware selection for the terminal device with a UWB ranging function is improved In block S103, the ranging security parameter is sent to the ranging chip via a communication channel between the security region and the ranging chip.

Optionally, the UWB chip also has a security region, that is, data in the security region cannot be read by any program in other regions. The communication channel between the security region of the processor and the UWB chip can be formed between the security region of the processor and the security region of the UWB chip. The communication channel is between the two security regions, and thus communication safety is improved and a data leakage of communication data transmitted in the communication channel is avoided.

In block S104, the ranging chip generates a ranging time parameter according to the ranging security parameter, and performs a ranging communication with the device to be ranged using the ranging time parameter to acquire a ranging result.

Condition and manner for generating the ranging time parameter are preset in the UWB chip, and the UWB chip generates the ranging time parameter according to the ranging security parameter in accordance with the condition and manner. For example, the ranging security parameter is the URSK, and the generated ranging time parameter is a scrambled timestamp sequence (STS).

It can be understood that the device to be ranged also has a UWB chip. The UWB chip of the device to be ranged may use the session parameter generated during the initial communication between the terminal device and the device to be ranged to generate the ranging security parameter, e.g., URSK. The UWB chip of the device to be ranged may further generate the ranging time parameter according to the ranging security parameter, for example generate a STS according to the URSK. After both the terminal device and the device to be ranged have generated the same ranging time parameter, the UWB chip of the terminal device and the UWB chip of the device to be ranged can use the ranging time parameter, e.g., the STS for the ranging communication, the UWB chip of the terminal device can acquire the ranging result, i.e., a distance between the terminal device and the device to be ranged through calculation(s) according to the communication result, and the UWB chip of the device to be ranged can acquire the ranging result, i.e., the distance between the terminal device and the device to be ranged through calculation(s) according to the communication result. The ranging communication between the UWB chip of the terminal device and the UWB chip of the device to be ranged may be performed as follows. The terminal device generates a first UWB packet containing the STS according to data rules, and sends the first UWB packet to the device to be ranged. The device to be ranged verifies whether the STS in the first UWB packet is the same as the STS generated by the UWB chip of the device to be ranged. If they are the same, a second UWB packet containing the STS is generated according to the data rules, and is returned to the terminal device. The terminal device verifies whether the STS in the second UWB packet is the same as the STS generated by the UWB chip of the terminal device. If they are the same, a third UWB packet containing the STS is generated according to the data rules, and is sent to the device to be ranged to complete the ranging communication.

In the present disclosure, by communicating the security region of the processor with the ranging chip, the session parameter generated during the initial communication between the terminal device and the device to be ranged is acquired, the ranging security parameter is generated according to the session parameter in the security region, the ranging security parameter is sent to the ranging chip through the communication channel between the security region and the ranging chip, and the ranging chip generates the ranging time parameter according to the ranging security parameter and performs the ranging communication with the device to be ranged using the ranging time parameter to acquire a ranging result. Since the ranging security parameter is generated in the security region of the processor and the communication channel between the security region and the ranging chip is safe, the ranging security parameter is relatively safe before entering the ranging chip, and data leakage can be avoided, thus improving the parameter security in the ranging process, ensuring the security of application scenarios such as location sensing, non-inductive payment, non-inductive entrance and non-inductive unlock, and avoiding threats to user's information and property safeties.

In some embodiments of the present disclosure, before the terminal device leaves the factory, the first security parameter can be preset in the security region of the processor, and the second security parameter can be preset in the security region of the ranging chip, where the first security parameter and the second security parameter can be keys. On this basis, the terminal device can establish the communication channel between the security region and the ranging chip according to the first security parameter preset in the security region and the second security parameter preset in the ranging chip.

In an embodiment, both the first security parameter and the second security parameter are a public security parameter, such as a symmetric key, that is, the first security parameter and the second security parameter are a common security parameter, i.e., the same security parameter, such as the same key. In this embodiment, the communication channel can be generated between the security region and the ranging chip according to the public security parameter. Specific generating process of the communication channel may be determined according to communication protocols such as SCP02 or SCP03.

In another embodiment, the first security parameter includes a public security parameter and a secret security parameter of the security region, and a public security parameter of the ranging chip, and the second security parameter includes the public security parameter and a secret security parameter of the ranging chip, and the public security parameter of the security region. For example, the first security parameter and the second security parameter can be asymmetric keys, the first security parameter includes DEV PK/SK, and UWB. PK (i.e., a public key and a secret key of the terminal device, and a public key of the device to be ranged), and the second security parameter includes DEV PK, and UWB PK/SK (i.e., the public key of the terminal device, and the public key and the secret key of the device to be ranged). In this embodiment, a common security parameter is generated according to the first security parameter in the security region. For example, the UKS TA generates a common security parameter (referred as scret) according to the first security parameter by using Diffie-Hellman algorithm. Further, the ranging chip generates said common security parameter scret according to the second security parameter. For example, the UWB chip generates the common security parameter scret according to the second security parameter by using Diffie-Hellman algorithm. According to the common security parameter scret, the communication channel is generated between the security region and the ranging chip. The specific generating process of the communication channel may be determined according to protocols such as SCP11 protocol.

In the above two embodiments, during the generating of the communication channel between the security region and the ranging chip, in the security region, the public or common security parameter is preprocessed to generate a temporary security parameter. For example, the UKS TA performs hashing on preset data of the public or common security parameter to acquire the temporary security parameter such as one-time session key. Further, the common security parameter is preprocessed by the ranging chip to generate said temporary security parameter. For example, the UWB chip performs hashing on the preset data of the public or common security parameter to acquire the temporary security parameter such as one-time session key. The communication channel between the security region and the ranging chip is generated according to the temporary security parameter. In the case that the temporary security parameter is used to generate the communication channel, the public or common security parameter is used as a root key. When the communication channel needs to be established, a one-time session key that is only valid for this time is generated. In this way, the security of the public or common security parameter is improved, the security of the communication channel is improved, and thus the security of the ranging security parameter transmitted in the communication channel is improved. Even if the temporary security parameter is lost or leaked during the generation of the communication channel, due to the irreversibility of the hashing process, the security of the generation of the communication channel for the next communication can still be guaranteed.

Figure 3:
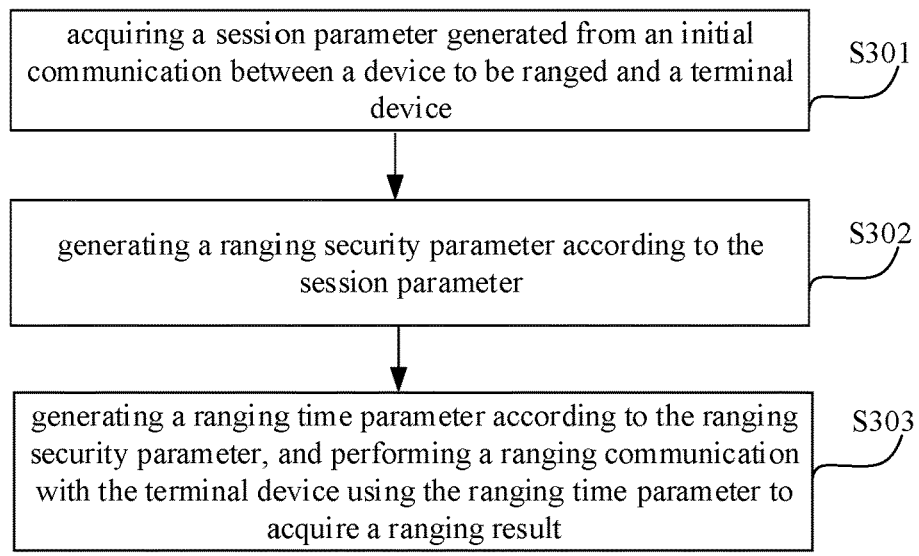
FIG. 3 a flow chart of a ranging method applied in a device to be ranged according to an embodiment of the present disclosure.

In a second aspect of embodiments of the present disclosure, a ranging method is provided. The ranging method includes operations S301 to S303 as shown in FIG. 3. Such a ranging method is applied in the device to be ranged as described in the above embodiments of the first aspect.

In block S301, a session parameter generated from an initial communication between the device to be ranged and a terminal device is acquired.

In block S302, a ranging security parameter is generated according to the session parameter.

In block S303, a ranging time parameter is generated according to the ranging security parameter, and a ranging communication is performed with the terminal device using the ranging time parameter to acquire a ranging result.

The ranging method in the embodiments of the second aspect including operations corresponding to the operations of the ranging method in the embodiments of the first aspect (performed using the terminal device), and the difference is that all operations in these embodiments are performed in the ranging chip of the device to be ranged, such as the UWB chip.

In a third aspect of embodiments of the present disclosure, a ranging apparatus is provided, which is performed using a terminal device. The terminal device has a processor and a ranging chip, and the processor has a security region.

Figure 4:
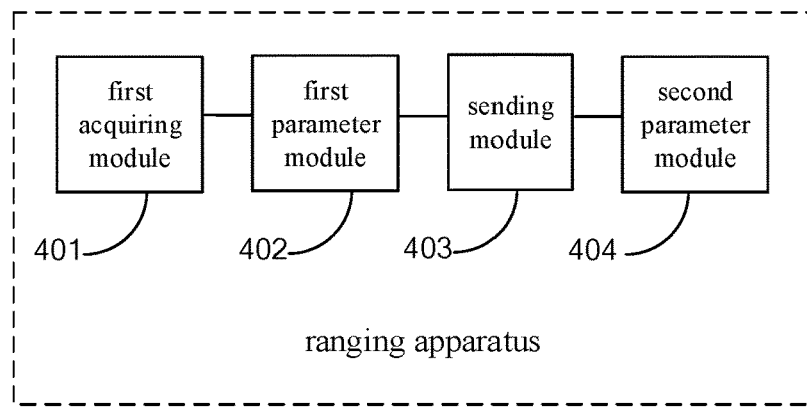
FIG. 4 is a block diagram of a ranging apparatus applied in a terminal device according to an embodiment of the present disclosure.
Figure 5:
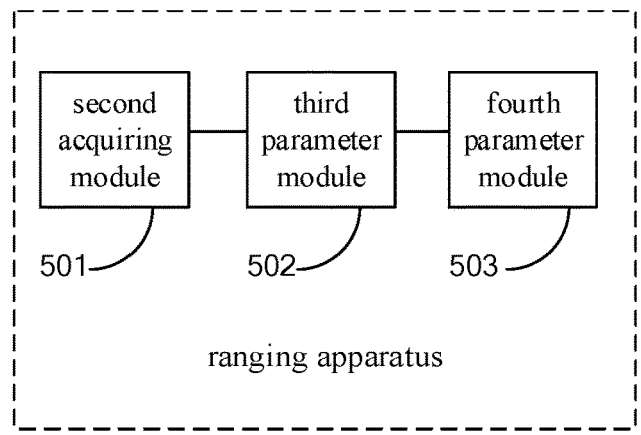
FIG. 5 is a block diagram of a ranging apparatus applied in a device to be ranged according to an embodiment of the present disclosure.

As shown in FIG. 4, the ranging apparatus includes: a first acquiring module 401, a first parameter module 402, a sending module 403, and a second parameter module 404. The first acquiring module 401 is configured to acquire a session parameter generated from an initial communication between the terminal device and a device to be ranged. The first parameter module 402 is configured to generate, in the security region, a ranging security parameter according to the session parameter. The sending module 403 is configured to send the ranging security parameter to the ranging chip via a communication channel between the security region and the ranging chip. The second parameter module 404 is configured to control the ranging chip to generate a ranging time parameter according to the ranging security parameter, and perform a ranging communication with the device to be ranged using the ranging time parameter to acquire a ranging result.

In some embodiments, the ranging apparatus includes a channel-establishing module configured to generate the communication channel between the security region and the ranging chip according to a first security parameter preset in the security region and a second security parameter preset in the ranging chip.

In some embodiments, the first security parameter and the second security parameter are a common safety parameter, and the channel-establishing module is configured to generate the communication channel between the security region and the ranging chip according to the common security parameter.

In some embodiments, the first security parameter includes a public security parameter and a secret security parameter of the security region, and a public security parameter of the ranging chip, and the second security parameter includes the public security parameter and a secret security parameter of the ranging chip, and the public security parameter of the security region. The channel-establishing module is configured to: generate a common security parameter according to the first security parameter in the security region; generate, by the ranging chip, the common security parameter according to the second security parameter; and generate the communication channel between the security region and the ranging chip according to the common security parameter.

In some embodiments, in case that the channel-establishing module is configured to generate the communication channel between the security region and the ranging chip according to the common security parameter, the channel-establishing module is further configured to: preprocess the common security parameter in the security region to generate a temporary security parameter; preprocess the common security parameter by the ranging chip to generate the temporary security parameter; and generate the communication channel between the security region and the ranging chip according to the temporary security parameter.

In some embodiments, the ranging apparatus further includes a communication module configured to perform the initial communication by communicating with the device to be ranged to allow the terminal device and the device to be ranged to verify identities of each other; and in response to determining that the identities of the terminal device and the device to be ranged are verified by each other, communicating with the device to be ranged to allow the terminal device and the device to be ranged to generate the same session parameter.

In a fourth aspect of embodiments of the present disclosure, a ranging apparatus is provided, which is performed using a device to be ranged. The ranging apparatus includes a second acquiring module 501, a third parameter module 502, and a fourth parameter module 503. The second acquiring module 501 is configured to acquire a session parameter generated from an initial communication between the device to be ranged and a terminal device. The third parameter module 502 is configured to generate a ranging security parameter according to the session parameter. The fourth parameter module 503 is configured to generate a ranging time parameter according to the ranging security parameter, and perform a ranging communication with the terminal device using the ranging time parameter to acquire a ranging result.

Regarding the apparatuses in the above-mentioned embodiments, the specific manners in which each module performs operations have been described in detail in the embodiments of the methods, and thus will not be described here again.

Figure 6:
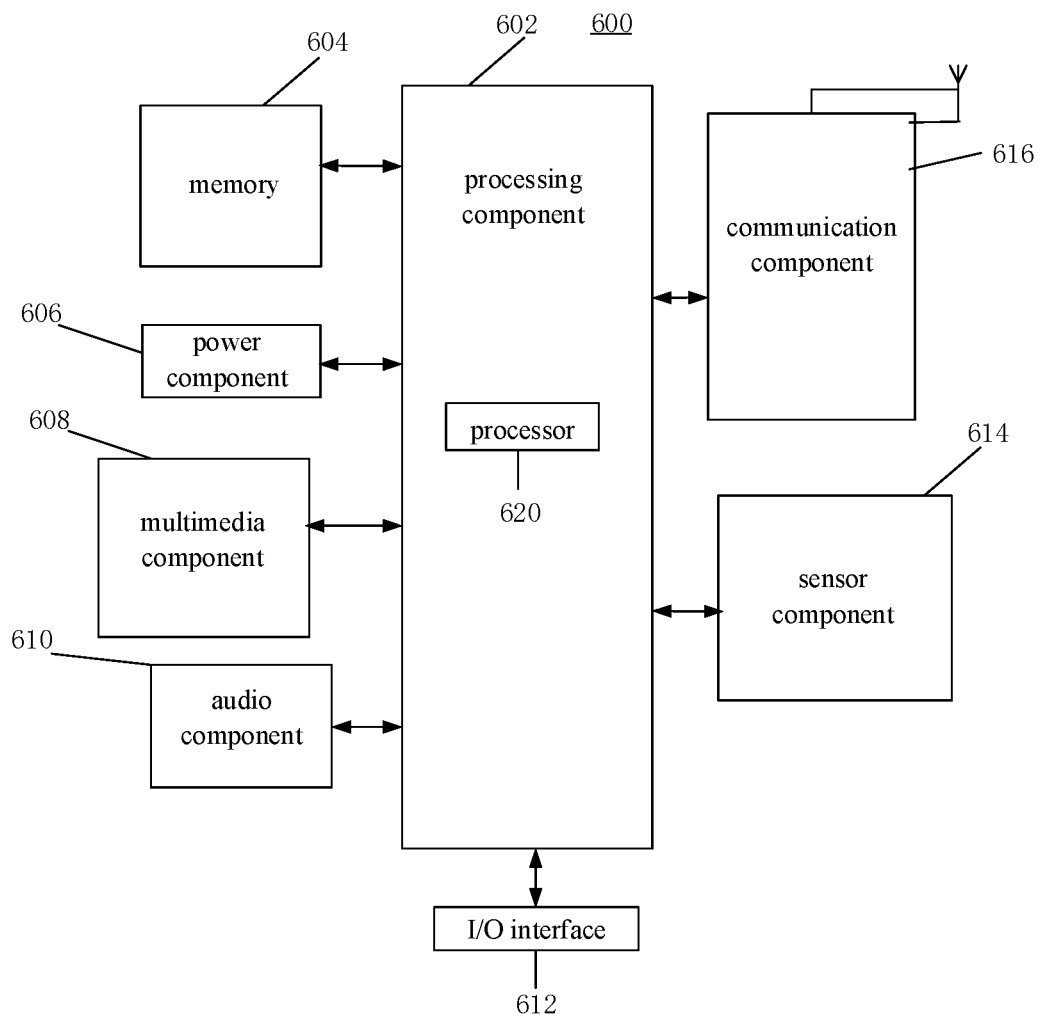
FIG. 6 is a block diagram of an electronic device according to an embodiment of the present disclosure.

In a fifth aspect of embodiments of the present disclosure, an electronic device is provided. FIG. 6 is a block diagram showing the electronic device 600. For example, the electronic device 600 may be a mobile phone, a computer, a digital broadcasting terminal, a messaging device, a game console, a tablet device, a medical device, exercise device, a personal digital assistant, and the like.

Referring to FIG. 6, the device 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the device 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the device 600. Examples of such data include instructions for any applications or methods operated on the device 600, contact data, phonebook data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the device 600. The power component 606 may include a power management system, one or more power sources, and any other components associated with the generation, management, and distribution of power in the device 600.

The multimedia component 608 includes a screen providing an output interface between the device 600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and the rear camera may receive an external multimedia datum while the device 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone (MIC) configured to receive an external audio signal when the device 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the device 600. For instance, the sensor component 614 may detect an open/closed status of the device 600, relative positioning of components, e.g., the display and the keypad, of the device 600, a change in position of the device 600 or a component of the device 600, a presence or absence of user contact with the device 600, an orientation or an acceleration/deceleration of the device 600, and a change in temperature of the device 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate communication, wired or wirelessly, between the device 600 and other devices. The device 600 can access a wireless network based on a communication standard, such as WiFi, 2G, 3G, 4G, 5G or a combination thereof. In one embodiment, the communication component 616 receives a broadcast signal or broadcast associated information from an external broadcast management system via a broadcast channel. In one embodiment, the communication component 616 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In some embodiments, the device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as included in the memory 604, executable by the processor 620 in the device 600, for performing the above-described methods. For example, the non-transitory computer-readable storage medium may be a ROM, a RAM, a CD-ROM, a magnetic tape, a floppy disc, an optical data storage device, and the like.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and examples be considered as illustrated only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A ranging method, performed using a terminal device comprising a processor and a ranging chip, the processor having a security region, and the security region being communicatively connected to the ranging chip, the ranging method comprising:
    acquiring a session parameter generated from an initial communication between the terminal device and a device to be ranged;
    generating, in the security region, a ranging security parameter according to the session parameter;
    sending the ranging security parameter to the ranging chip via a communication channel between the security region and the ranging chip; and
    generating, by the ranging chip, a ranging time parameter according to the ranging security parameter, and performing, by the ranging chip, a ranging communication with the device to be ranged using the ranging time parameter to acquire a ranging result;
    wherein the method further comprises:
    generating the communication channel between the security region and the ranging chip according to a first security parameter preset in the security region and a second security parameter preset in the ranging chip.

2. The ranging method according to claim 1, wherein the first security parameter and the second security parameter are a common safety parameter; and
generating the communication channel between the security region and the ranging chip according to the first security parameter preset in the security region and the second security parameter preset in the ranging chip comprises:
generating the communication channel between the security region and the ranging chip according to the common security parameters.

3. The ranging method according to claim 2, wherein generating the communication channel between the security region and the ranging chip according to the common security parameter comprises:
preprocessing the common security parameter in the security region to generate a temporary security parameter;
preprocessing the common security parameter by the ranging chip to generate the temporary security parameter; and
generating the communication channel between the security region and the ranging chip according to the temporary security parameter.

4. The ranging method according to claim 1, wherein the first security parameter comprises a first public security parameter and a first secret security parameter of the security region, and a second public security parameter of the ranging chip, and the second security parameter comprises the second public security parameter and a second secret security parameter of the ranging chip, and the first public security parameter of the security region; and
generating the communication channel between the security region and the ranging chip according to the first security parameter preset in the security region and the second security parameter preset in the ranging chip comprises:
generating a common security parameter according to the first security parameter in the security region;
generating, by the ranging chip, the common security parameter according to the second security parameter; and
generating the communication channel between the security region and the ranging chip according to the common security parameter.

5. The ranging method according to claim 4, wherein generating the communication channel between the security region and the ranging chip according to the common security parameter comprises:
preprocessing the common security parameter in the security region to generate a temporary security parameter;
preprocessing the common security parameter by the ranging chip to generate the temporary security parameter; and
generating the communication channel between the security region and the ranging chip according to the temporary security parameter.

6. The ranging method according to claim 1, further comprising: performing the initial communication, comprising:
communicating with the device to be ranged to allow the terminal device and the device to be ranged to verify identities of each other; and
in response to determining that the identities of the terminal device and the device to be ranged are verified by each other, communicating with the device to be ranged to allow the terminal device and the device to be ranged to generate the same session parameter.

7. A non-transitory computer-readable storage medium having stored therein a computer program that, when executed by a processor, causes the processor to implement the ranging method according to claim 1.

8. The non-transitory computer-readable storage medium according to claim 7, wherein the first security parameter and the second security parameter are a common safety parameter; and
generating the communication channel between the security region and the ranging chip according to the first security parameter preset in the security region and the second security parameter preset in the ranging chip comprises:
generating the communication channel between the security region and the ranging chip according to the common security parameters.

9. An electronic device, comprising:
a processor; and
a memory having stored therein computer instructions executable by the processor, wherein in case that the computer instructions are executed by the processor, the processor is configured to implement a ranging method, comprising:
acquiring a session parameter generated from an initial communication between a terminal device and a device to be ranged;
generating, in a security region, a ranging security parameter according to the session parameter;
sending the ranging security parameter to a ranging chip via a communication channel between the security region and the ranging chip; and
generating a ranging time parameter according to the ranging security parameter, and performing a ranging communication with the device to be ranged using the ranging time parameter to acquire a ranging result;
wherein the method further comprises:
generating the communication channel between the security region and the ranging chip according to a first security parameter preset in the security region and a second security parameter preset in the ranging chip.

10. The electronic device according to claim 9, wherein the first security parameter and the second security parameter are a common safety parameter; and
generating the communication channel between the security region and the ranging chip according to the first security parameter preset in the security region and the second security parameter preset in the ranging chip comprises:
generating the communication channel between the security region and the ranging chip according to the common security parameters.

11. The electronic device according to claim 9, wherein the first security parameter comprises a first public security parameter and a first secret security parameter of the security region, and a second public security parameter of the ranging chip, and the second security parameter comprises the second public security parameter and a second secret security parameter of the ranging chip, and the first public security parameter of the security region; and
generating the communication channel between the security region and the ranging chip according to the first security parameter preset in the security region and the second security parameter preset in the ranging chip comprises:

generating a common security parameter according to the first security parameter in the security region;

generating, by the ranging chip, the common security parameter according to the second security parameter; and generating the communication channel between the security region and the ranging chip according to the common security parameter.

12. The electronic device according to claim 11, wherein generating the communication channel between the security region and the ranging chip according to the common security parameter comprises:

preprocessing the common security parameter in the security region to generate a temporary security parameter;

preprocessing the common security parameter by the ranging chip to generate the temporary security parameter; and generating the communication channel between the security region and the ranging chip according to the temporary security parameter.

13. The electronic device according to claim 11, wherein generating the communication channel between the security region and the ranging chip according to the common security parameter comprises:

preprocessing the common security parameter in the security region to generate a temporary security parameter;

preprocessing the common security parameter by the ranging chip to generate the temporary security parameter; and generating the communication channel between the security region and the ranging chip according to the temporary security parameter.

14. The electronic device according to claim 9, the ranging method further comprises: performing the initial communication, comprising:

communicating with the device to be ranged to allow the terminal device and the device to be ranged to verify identities of each other; and in response to determining that the identities of the terminal device and the device to be ranged are verified by each other, communicating with the device to be ranged to allow the terminal device and the device to be ranged to generate the same session parameter.

* * * * *